May 3, 1955

J. C. MARBLE 2,707,539

HYDRAULIC TRANSMISSION

Filed July 22, 1948

INVENTOR

May 3, 1955  J. C. MARBLE  2,707,539
HYDRAULIC TRANSMISSION
Filed July 22, 1948  3 Sheets-Sheet 2

INVENTOR
James C. Marble

May 3, 1955  J. C. MARBLE  2,707,539
HYDRAULIC TRANSMISSION
Filed July 22, 1948  3 Sheets-Sheet 3

INVENTOR

United States Patent Office 2,707,539
Patented May 3, 1955

2,707,539

HYDRAULIC TRANSMISSION

Jarvis C. Marble, Riverside, Conn., assignor, by mesne assignments, to Jarvis C. Marble, New York, N. Y., Leslie M. Merrill, Westfield, N. J., and Percy H. Batten, Racine, Wis., in trust Application July 22, 1948, Serial No. 40,075

21 Claims. (Cl. 192—.07)

This invention relates to power transmissions, particularly for vehicle drives, and control systems therefor. More particularly the invention relates to such apparatus for internal combustion engine driven vehicles such as automobiles and the like, and still more particularly the invention relates to such apparatus in which drive is effected under some conditions by variable-speed hydraulic torque converting mechanism of the kind in which power transmitting liquid is circulated in a closed circuit by an engine driven bladed pump member through turbine blading connected to the driven member of the transmission and through reaction blading in the circuit, while under other conditions drive through the transmission is effected through a path of power transmission providing a fixed or substantially fixed speed ratio of drive between the driving and driven members of the transmission, as for example the conventional "direct" drive, or the so-called "overdrive."

Transmissions of the kind in which drive from an engine to the driving wheels of a vehicle may be alternatively secured through a hydraulic torque converter mechanism such as above described or through a direct mechanical driving connection have heretofore been developed and used, but as heretofore developed such transmissions and the controls have not provided the operational characteristics, particularly with regard to the shifting from hydraulic drive to mechanical drive and vice versa, necessary to satisfactorily meet all of the different conditions encountered in the driving of automotive vehicles under modern highway conditions.

It is therefore a general object of the present invention to provide a new and improved transmission means of the kind under discussion having a control system which will permit the vehicle operator to control the functional operation of the apparatus in a very simple manner which is consistent with normal driving habits, and which incorporates automatic shifting arrangements for shifting from torque converter drive to another drive under predetermined conditions of operation and back to torque converter drive under other predetermined conditions of operation, while at the same time permitting the operator to overrule the automatic shift and effect a selective manually controlled shift under (but limited to) those operating conditions when driving benefit can be obtained by making such a shift.

Other and more detailed objects of the invention and the manner in which advantage may best be taken of the principles of the invention will best be understood by consideration of the ensuing portion of this specification taken in conjunction with the accompanying drawings which disclose by way of example but without limitation several embodiments of apparatus for carrying the invention into effect.

Figures 1, 2, 3:
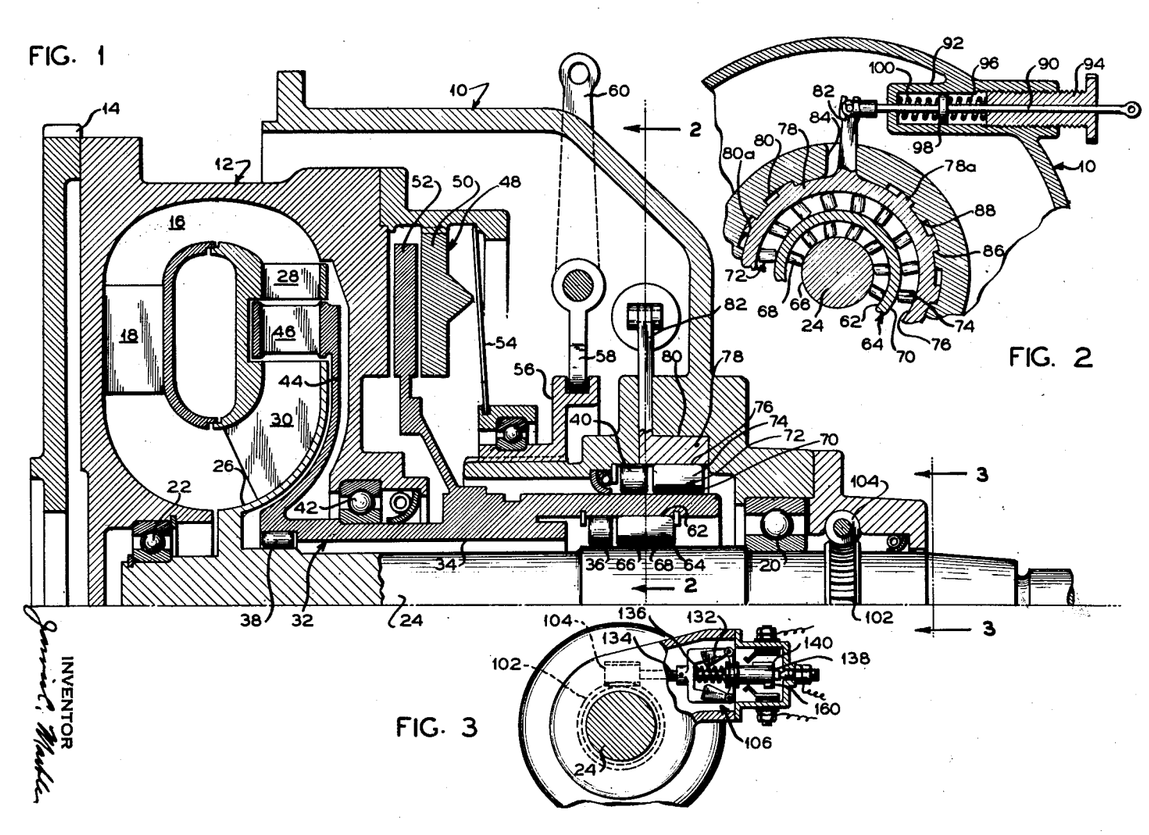
Fig. 1 is a more or less diagrammatic longitudinal half section of a transmission suitable for carrying the invention into effect.
Fig. 2 is a fragmentary section taken on the line 2—2 of Fig. 1.
Fig. 3 is a view taken on the line 3—3 of Fig. 1, certain parts being broken away.

Referring now more particularly to Figs. 1 to 3, there is illustrated more or less diagrammatically one form of torque converter construction adapted to utilize the principles of the invention. The structure comprises an outer stationary housing indicated generally at 10 adapted to be secured for example to the bell housing of an internal combustion engine constituting the power source, and an inner rotatably mounted casing indicated generally at 12 and provided at 14 with teeth adapted to engage mating internal driving teeth on the flywheel of the engine.

Casing 12 is shaped to provide the working chamber 16 for circulation of the working liquid in a hydrodynamic circuit of known kind and carries the ring of pump or impeller blades 18 for producing circulation.

Rotatably mounted in bearings 20 and 22 carried respectively by the stationary and rotating casings is the driven shaft member 24 which at its forward end carries the turbine wheel 26 provided with a ring of first stage turbine blades 28 and a ring of second stage blades 30.

A reaction member, indicated generally at 32, comprises a hollow shaft or sleeve part 34 rotatably mounted between the driven shaft 24 on the one hand and the stationary and rotating casings on the other hand by bearings 36, 38, 40 and 42. The forward end of the member provides a reaction wheel 44 carrying a ring of reaction blades 46 located in the circuit between turbine blades 28 and 30.

A direct drive friction clutch indicated generally at 48 is provided by a slidably mounted driving plate 50 carried by the rotating casing and a driven plate 52 carried by the reaction member 32. Plate 50 is actuated to engage or disengage the clutch through the medium of a plate type clutch spring 54, the shift sleeve 56 slidably mounted on an extension of the stationary housing, and the shift fork 58 pivotally carried by the stationary housing and fixed to the external clutch control lever 60.

At its rearward end the reaction member provides the outer race 62 of an overrunning clutch 64 the inner race 66 of which is formed by the driven shaft 24. One-way overrunning clutch action is provided by the wedging elements 68 in known fashion. The reaction member also provides the inner race 70 of a second overrunning clutch 72 having wedging elements 74. The outer race 76 of this clutch is provided by a reaction ring member 78 journalled in a splined bore 80 in the stationary housing 10. Member 78 is provided with splines 78a and a radially projecting arm 82 passing through an opening 84 in the casing wall. Splines 78a are narrower than the spring recesses 80a in bore 80, which provide abutment surfaces 86 and 88 for limiting the turning movement of the ring member, preferably to a relatively small arc, as seen in Fig. 2. Arm 82 is attached to the inner end of a control rod 90 passing through a cylinder 92, formed in the housing 10, to the exterior of the housing. A threaded adjusting plug 94, through which rod 90 passes, provides a retainer for one end of a spring 96 the other end of which is held by the retainer 98 on rod 90. A second spring 100 is held between the retainer 98 and the inner end of cylinder 92.

The driven shaft 24 carries a worm wheel 102 engaging worm 104 for actuating a speed responsive switch indicated generally at 106 (Fig. 3) and incorporated in a control circuit hereinafter to be described.

The basic operation of the hydrodynamic torque converter circuit is well known. The working liquid is circulated radially outwardly by the impeller blades 18 and flows radially inwardly through the blades 28, 46 and 30 to the pump inlet. Assuming the rotation of the pump to be left-handed or counterclockwise as viewed from the right in Fig. 1, torque in the same direction is exerted on the turbine blades 28 and 30 and in the opposite direction on the reaction blades 46. This tends to rotate the latter in clockwise direction as viewed in Fig. 2, which causes the overrunning clutch elements 74 to wedge and transmit the reaction torque through ring 78 to the stationary housing 10, since turning movement of the ring is limited by the abutments 86.

If, as shown in Fig. 1, the direct drive clutch 48 is disengaged, the torque on the turbine wheel turns the driven shaft in the same direction as that of the driving member (counterclockwise as viewed in Fig. 2) this movement being permitted by the inner overrunning clutch elements 68. In this case, variable speed hydraulic torque converting drive is obtained.

If, on the other hand, the clutch 48 is engaged, the reaction member 32 turns at pump speed in the same direction as the pump, such turning being permitted by the overrunning action of the clutch elements 74. In any normal operation of the hydraulic drive the speed of the turbine blading and the driven shaft 24 is always less than that of the input or driving member, and when the clutch 48 is engaged to turn the reaction member at the speed of the driving member, the overrunning clutch elements 68 engage to transmit drive at input speed from the reaction member to the driven or output shaft 24. Thus a direct mechanical drive to shaft 24 is obtained via the rotating casing 12, clutch 48, reaction member 32 and the overrunning clutch 64. Under these conditions the pump, reaction and turbine blades in the hydraulic circuit all turn in the same direction at the same speed so that no parasite losses are incurred so far as the hydraulic circuit is concerned. The feature of employing the reaction member to provide the mechanical connection for transmitting drive from the input to the output member forms per se no part of the present invention and constitutes claimed subject matter in the application of Karl Gustav Åhlen, Serial No. 29,446, filed May 27, 1948.

Figure 4:
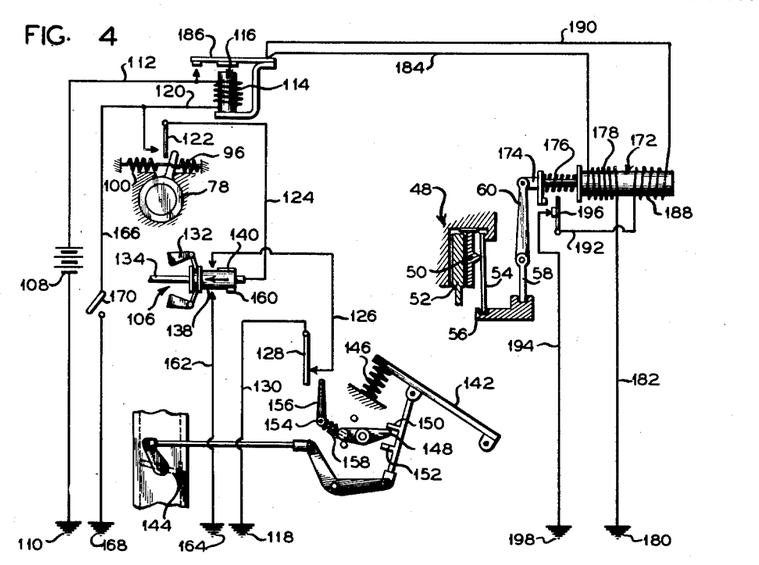
Fig. 4 is a schematic diagram illustrative of a control system embodying the principles of the invention.

As previously stated, it is an object of this invention to provide a transmission and a control therefor which will adequately meet driving needs for automotive vehicles propelled by internal combustion engines and one form of such control system adapted to be employed with a transmission of the kind previously described is illustrated diagrammatically in Fig. 4.

As shown in this figure, the clutch 48 corresponds to the direct drive clutch shown in Fig. 1, the reaction torque responsive ring 78 corresponds to that shown in Fig. 1 and the speed responsive switch 106 corresponds to that shown in Fig. 3.

The control system shown is electrically actuated, being energized for example by means of the battery 108, one side of which is grounded as at 110 and the other side of which is connected by means of a lead 112 to the energizing coil 114 of a relay indicated generally at 116.

One end of the relay coil 114 may be connected with the ground at 118 through a circuit embodying a lead 120 connected to a switch 122 which may for convenience be referred to as a torque control switch, a lead 124 leading from the torque control switch 122 to the speed responsive switch 106, and lead 126 leading from the speed responsive switch to a switch 128 which may be referred to as a throttle control or "kick down" switch and lead 130 connecting the latter with ground 118. As will be observed the three switches 122, 106 and 128 are connected in series. Switch 122 is open when the torque responsive member is in the position shown in this figure, which corresponds to that shown in Fig. 2, and which is further indicative of hydraulically applied reaction torque of predetermined value on the torque member 32, such value, as will hereinafter be explained, being determined by the adjustment of the springs 96 and 100. Torque below the predetermined value or absence of torque on member 78 will operate to shift the member 78 under the influence of the springs to close switch 122.

Referring now to the speed responsive switch shown in the figure and also in Fig. 3, this comprises centrifugal weights 132 adapted to be rotated with shaft 134 driven by the worm 104 and to fly outwardly against the force of a spring 136 to move a sleeve member 138 to the left as seen in the figures as the speed of the driven member 24 and the worm 104 increases. The sleeve member is connected to lead 124 and carries a contact 140 adapted to make contact with lead 126 whenever the speed of the driven member exceeds a predetermind value and to maintain connection with lead 126 above such predetermined speed.

At 142 is indicated the usual accelerator pedal for controlling the throttle 144 of an engine to which the transmission is connected, the throttle pedal being depressed against the action of the usual throttle spring 146 and connected with the throttle through any suitable linkage so that the throttle is opened when the accelerator pedal is depressed. The throttle switch 128 is normally closed, but is arranged to be opened when the pedal is depressed slightly below the position corresponding to full open position of the throttle 144 to a position commonly known as "kick down" position. This is accomplished in the example diagrammatically illustrated by means of an over-center linkage comprising a pivoted lever having a lost motion connection between two abutments 150 and 152 on the throttle linkage and connected to a bellcrank lever 154 having an arm 156 adapted to open switch 128. Levers 148 and 154 are connected to be moved to terminal positions on either side of a dead center position and held in either terminal position by the action of spring 158.

For purposes to be later explained, the member 138 of the speed responsive switch is provided with a second contact 160 adapted to make contact with a lead 162 grounded at 164, at a predetermined speed of the driven member 24 higher than the predetermined speed at which the contact 140 connects with the lead 126, and as will be seen from the diagram lead 162 constitutes a shunt across the throttle switch 128. Also, for purposes later to be explained, a lead 166 connects the relay coil with ground 168 under the control of manually operable switch 170, this lead, when switch 170 is closed, constituting a shunt around the serially connected torque switch, speed responsive switch and throttle switch.

The clutch 48 is engaged by the energizing of an actuating solenoid indicated generally at 172, the armature 174 of which is connected with the clutch operating lever 60 and which is retracted by means of spring 176. In the arrangement shown the solenoid is energized to engage the clutch through the medium of coil 178 grounded at 180 through lead 182 and connected by lead 184 to the armature 186 of the relay 116. Advantageously a second coil 188 is connected at one end by lead 190 to the armature 186 and at its other end is connected through leads 192 and 194 under the control of switch 196 to ground 198. When the relay 116 is energized both coils 178 and 188 are energized to shift the clutch 48 to engage it. After engagement less force may be required to hold it in engagement than to engage it and in the arrangement shown this force may be termed holding force and may be produced by the coil 178 alone, the circuit through coil 188 being broken as the clutch is engaged by the action of a suitable abutment on the armature 174 operative to open switch 196 when the clutch 48 is shifted to direct drive position.

In order most readily to understand the functioning of the present invention and the manner in which its objects are attained, it is best first to briefly consider the basic operating characteristics of a hydraulic torque converter of the kind to which the invention relates. Further, for purposes of the following discussion, it will be assumed that the transmission is installed in an automotive vehicle, such as an automobile, driven by an internal combustion engine. With the vehicle at rest and the engine operating at its normal full speed, the circulation of the working fluid through the hydraulic circuit produces a reaction torque which is transmitted through the reaction member to the stationary housing and an output torque on the stationary turbine blades which in the case of a two stage converter of usual design may be of the order of three times the input torque. As the vehicle is accelerated by the application of the output torque to the driving wheels and the turbine blades revolve with a rising speed relative to the speed of the input member driving the pump blade, the ratio of torque multiplication diminishes until at a certain speed of the driven member relative to that of the driving member the value of the output torque drops to that of the input torque, and if the speed of the output member further increases relative to that of the input member the value of the output torque becomes even less than that of the input torque. The speed ratio at which the torques are equal, which is conveniently referred to as the "shifting point" for the converter, will vary with individual designs but for a converter of the kind herein illustrated a value for the shifting point of 0.7 may be reasonably assumed for purposes of discussion. At the shifting point, since the input and output torques are equal, the value of the reaction torque is zero and if the speed of the output member is increased relative to that of the input member to a ratio above that represented by the shifting point so that the output torque is less than the input torque, the direction or sense of the reaction torque reverses, so that it is in the same direction as the torque applied to the turbine blades rather than the opposite. The efficiency of the converter varies with the change in the speed ratio between driving and driven members from zero when the latter is at stall to a maximum which is usually attained at a speed ratio somewhat below the shifting point, for example, at a ratio of 0.5 or 0.6 and thereafter drops as the value of the speed ratio increases. With these general operating characteristics in mind it is obvious that no advantage is to be gained in operating the converter with the speed ratio between the driving and driven members above the shifting point and for that reason the alternative direct drive is provided for use under conditions which otherwise would result in the converter operating above the shifting point.

It is desirable to provide automatic means for effecting the shift from hydraulic to direct drive and vice versa, but these changes are desirably made under widely different operating conditions with which a fully automatic control cannot adequately cope and consequently means must be provided in any satisfactory control system whereby the operator of the vehicle may under appropriate conditions control the shift from one type of drive to the other, and the system hereinbefore described provides for automatic control coupled with what may be termed manual overrule control on the part of the operator.

Referring now more particularly to Fig. 4 the control system operates as follows, it being assumed that the transmission is installed in an internal combustion engine driven automotive vehicle which for purposes of discussion will be first considered as standing with the engine idling. With the clutch operating solenoid 172 deenergized clutch 48 is disengaged so that the transmission is set for hydraulic drive and under the assumed conditions this will be the case. The reason for this is that to energize the solenoid and engage the direct drive clutch, it is necessary for the relay 114 to be energized to connect the solenoid coil 178 in the circuit with battery 108 through the relay armature 186. Under the assumed conditions, with the converter pump rotating and the turbine blades stationary, reaction torque will be applied to the reaction control member 78 so that the reaction switch 122 is open to break the relay circuit. Also this circuit is further broken due to the fact that the driven member of the transmission is not rotating so that the speed responsive switch 106 is also open. The normal position of the throttle switch is closed as shown in the figure but regardless of whether this switch is opened or closed, the fact that the speed switch is open prevents the relay from actuating the solenoid to engage the direct drive clutch. This is also true whether the torque switch 122 is open or closed. If now the throttle is opened to speed up the engine and accelerate the vehicle, this is accomplished in hydraulic drive since the relay circuit is open. When a predetermined vehicle speed is attained which may, for example, be at the lowest vehicle speed at which direct drive may ever be desirable, and which may be relatively low as, for example, at 12 miles per hour, the speed switch is closed by the action of the centrifugal weights operating in response to vehicle speed. Such acceleration requires depression of the throttle or accelerator pedal within the normal throttle control range but the overcenter mechanism for operating the throttle switch is so arranged that movement of the pedal in its normal throttle range will not cause the overcenter mechanism to pass over center so as to open the throttle switch. Under the presently assumed conditions both the speed and throttle switches may be closed but under these conditions reaction torque is being applied which results in the reaction switch remaining open so that the relay circuit still remains open and hydraulic drive is maintained. If we now assume that the vehicle operator continues to accelerate the vhicle by maintaining the throttle open until a vehicle speed is reached which corresponds to the shifting point of the converter, and which if exceeded would result in less tractive effort than in direct drive, the resultant lack of reaction torque on the reaction control member causes the latter to move under the influence of the spring load on it to close the torque switch 122. With both the throttle and speed switches closed the closure of the torque switch completes the relay circuit and causes the direct drive clutch automatically to be engaged to effect direct drive. When the transmission is in direct drive, the pump, reaction and turbine blades in the hydraulic circuit rotate in unison so there is no circulation of the working fluid and consequently no reaction applied to the reaction blades. Because of this the reaction switch automatically remains closed whenever direct drive is in effect regardless of speed or load conditions on the engine. Once the vehicle is in direct drive the operator may then at will control its speed while remaining in direct drive throughout a speed range from the maximum speed obtainable by the vehicle to a predetermined minimum speed below which direct drive might result either in strain on the engine or stalling of the engine. This predetermined minimum speed, as noted previously, may be of the order of some 10 to 12 miles per hour and when that speed is reached the speed switch 106 breaks the relay circuit due to contact 140 moving out of contact with the lead 126, breaking the relay circuit to deenergize the solenoid 172 to disengage the direct drive clutch and return the transmission to hydraulic drive. From the foregoing it will be evident that the control system provides means whereby for starting and very low speeds hydraulic drive is insured and for speeds above the shifting point of the converter direct drive is insured, not only to effect more efficient drive than could be obtained in hydraulic drive, but also to avoid overheating of the converter due to continued operation of the converter in an inefficient range. As previously noted, the present system provides for manual control operative to overrule automatic control when such overrule may be desirable. In the case just discussed it was assumed that the vehicle was accelerated in hydraulic drive to a speed corresponding to the shift point of the converter. In terms of vehicle speed in an automobile this would ordinarily correspond to a relatively high vehicle speed, below which it might be desirable to shift from hydraulic to direct drive. If we assume for example that the speed switch closes at 12 miles per hour, that the shift point of the converter is at 50 miles per hour, and that the operator may wish to shift to direct drive at 20 miles per hour, all that is necessary for the operator to do is to momentarily ease off the accelerator pedal to permit the engine speed to drop sufficiently so that the ratio of the engine speed to the vehicle speed corresponds to the shift point ratio of the converter. When this is done the torque switch will close even though the vehicle speed is but 20 miles per hour and, the speed and throttle switches also being closed, the relay circuit is energized to effect shift to direct drive. Thus, the operator at will, within a predetermined speed range of the vehicle, can shift from hydraulic to direct drive.

As previously pointed out, once the direct drive is established it may be maintained down to a relatively very low vehicle speed. This, however, is not always desirable and in fact it is essential that for passing other vehicles and for operation at reasonably high vehicle speeds on grades where greater tractive effort is required for acceleration or hill climbing than direct drive will afford, the operator will be able at will to shift from direct drive back to torque multiplying hydraulic drive. It is for this purpose that the overcenter kick-down is provided in conjunction with the throttle pedal. With this arrangement, merely by pressing the pedal to its limit position, which is somewhat past normal full throttle position, the overcenter mechanism is moved past its center and the throttle switch is opened and maintained open to break the relay circuit and effect shift to hydraulic drive. Once the overcenter mechanism is shifted to its terminal position opposite that shown in the figure to open the throttle switch by a kick-down operation, it will remain in that position, holding the throttle switch open, until the throttle pedal is again permitted to rise to a position corresponding to less than full throttle opening so that the abutment 152 on the linkage will shift the mechanism overcenter back to the position shown in the figure, which corresponds to a closed throttle switch. With this mechanism alone it might be possible for an operator to improperly remain in hydraulic drive at a vehicle speed above that at which the drive should automatically, regardless of the operator's wishes, shift to direct drive. This will be evident from the fact that if the operator continued to hold the throttle pedal in kick-down position the throttle switch 128 would be manually held opened regardless of car speed and the relay circuit maintained opened so that the direct drive clutch could not be engaged. It is in order to obviate this possibility that the shunt lead 162 around the throttle switch is provided for use with the contact 160 on the speed switch. The position of the contact 160 on the speed switch is located so that at a car speed corresponding to the shift point of the converter at full throttle this contact connects with the shunt lead to enable the relay circuit to be closed by the speed and torque switches alone to effect direct drive under the assumed conditions regardless of the position of the throttle switch.

Although under any normal operating conditions it is desirable to establish a minimum vehicle speed at which direct drive may be maintained, in order to avoid engine stalling and the like, it is under abnormal circumstances desirable to provide a positive mechanical connection between the driving wheels and the engine with the vehicle standing still or at extremely low vehicle speeds. One such circumstance is when it may be desired to start a dead engine by towing the vehicle. Again, owing to extremely hazardous traction conditions it may be desirable to employ positive engine braking at very low car speeds of the order of one or two miles per hour. In order to permit these abnormal conditions to be taken care of the shunt lead 166 and switch 170 are provided. The latter switch is open for all normal conditions and may advantageously be located on the dash of the vehicle or in some other place a distance from the usual controls but where it is available to energize the relay circuit and secure direct drive even with the vehicle standing still.

Figure 5:
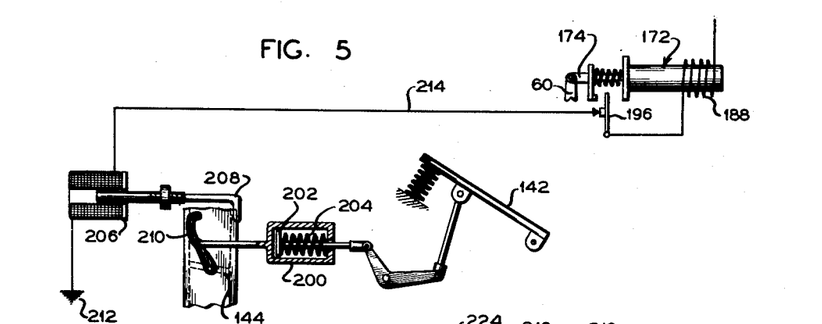
Fig. 5 is a schematic view showing an additional control applicable to the system shown in Fig 4.

As previously explained, shift from hydraulic drive to direct drive may be effected either automatically regardless of the will of the operator when the maximum vehicle speed at which converter drive should be maintained is reached, or at a lower vehicle speed at the will of the operator. In the former case, the shift will always take place at a time when the driven member is rotating at a lower speed than the driving member so that a differential speed between these members must be taken up when the direct drive clutch is engaged to cause the members to rotate at the same speed. With a friction type clutch having a relative soft engagement, of which many kinds are available, this speed differential can be taken up in the case of light vehicles without creating a surge in the operation of the vehicle when the shift is made which is of undesirable magnitude. In the case of heavy vehicles and engines, with large inertia forces, an undesirable surge might result from the automatic shift to direct drive under full throttle conditions and in Fig. 5 there is illustrated additional means which may be employed in conjunction with the control system shown in Fig. 4 to reduce or eliminate such surge. As shown in this figure, the linkage between the throttle pedal 142 and throttle 144 includes a spring loaded lost motion connection diagrammatically illustrated and comprises a cylinder 200 containing a plunger 202 loaded by spring 204 and so arranged that the force for opening the throttle is yieldably transmitted through spring 204, thus making it possible to close the throttle by compressing this spring without there necessarily being any movement toward closed throttle position of the pedal 142 from whatever position it may be at the moment held by the foot of the operator. A solenoid 206 is provided, the armature 208 of which is adapted to engage an extension 210 on the throttle operating lever to move the throttle to closed position against the action of spring 204 whenever the solenoid is energized. One end of the solenoid coil is grounded at 212 and the other end is connected by lead 214 to a contact on the switch 196 in the circuit including the solenoid coil 188.

Figure 6:
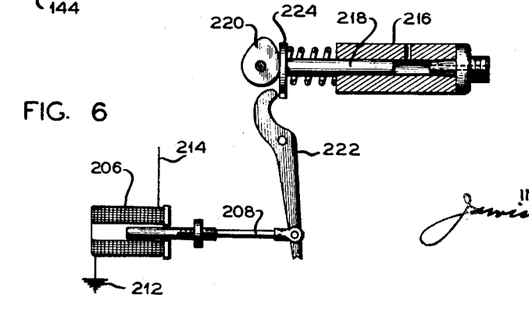
Fig. 6 is a similar schematic illustration of another additional or supplemental control applicable to the system shown in Fig. 4.

With this arrangement, whenever the relay circuit is energized to energize the solenoid circuit 188 and effect the engagement of the direct drive clutch, the solenoid 206 is simultaneously energized and the armature of this solenoid acts to close the throttle of the engine, thus reducing engine speed and the speed differential between the driven and driving members of the transmission. The energizing of the solenoid 206 is however only momentary since when the direct drive clutch is engaged the circuit is broken by the opening of the switch 196. As soon as the solenoid 206 is denergized the throttle may then assume the position determined by the position of the throttle pedal 142. In some instances the power plant may be an engine of the injection type in which the speed and power of the engine is controlled by regulation of a fuel pump and in Fig. 6 there is diagrammatically illustrated an arrangement for effecting the same results as obtained in the arrangement shown in Fig. 5. In this instance the fuel pump is diagrammatically illustrated at 216 and comprises a pump plunger 218 actuated by the engine driven cam 220 in the usual manner. In this instance the armature 208 of the solenoid 206 is connected to the lever 222, one arm of which is adapted to engage the plunger plate 224 to render the pump momentarily inoperative to inject fuel when solenoid 206 is energized.

When shift from hydraulic to direct drive is made at will be the operator, this, as previously explained, is effected by the operator closing or partially closing the throttle manually to reduce engine speed to an extent resulting in the shift point of the converter being reached. In this situation the throttle may be closed or substantially closed by the operator prior to shift so that no appreciable surge will be encountered in any event and, while under such circumstances the action of an automatic throttle closing device may not be required, no adverse effect results from its use.

While for purposes of explaining the principles of the invention and illustrating a form of apparatus for carrying it into effect, it will be apparent that within the scope of the invention many different specific control arrangements may be employed and further that some of the features of the invention may be utilized to advantage to the exclusion of others. Among the more important features is that of the control which is automatically responsive to the value of the hydraulically applied reaction torque on the reaction member of the torque converter since this form of control is independent of the specific engine and vehicle speeds and is automatically operable to enable desired shifts to be made under desired conditions throughout the full operating speed range of the vehicle. Also, it is to be noted that so far as the torque responsive control is concerned this may readily be adjusted through the spring means provided so that the torque control member will shift at any desired predetermined ratio of output to input torque. For purposes of explanation, the control system is hereinbefore described as operating to provide automatic shift, regardless of the will of the operator, when the shift point corresponding to a 1:1 torque ratio is obtained. In many instances it may be desirable to adjust the control so that the torque control shifts before the value of the secondary torque drops to the same value as the primary torque. The reason for this is that in certain designs of converter the maximum efficiency of the converter may occur at a speed ratio between the driven and driving members considerably below the speed ratio corresponding to the shift point and in the speed range of the secondary member between the point of maximum efficiency and the shift point it may be desirable to shift to direct drive in order to secure the higher efficiency of that type of drive while at the same time sacrificing only a relatively small increase in secondary torque over primary torque. As will be readily apparent from the previous description the adjustment of the plug 94 (Fig. 2) can readily be made such that a predetermined value of hydraulic reaction torque is required to move the torque control member to the position shown in this figure. With such an adjustment the torque control member will then shift under the action of spring 96 while reaction torque is still being applied to the reaction member. Conversely, while ordinarily not desirable the arrangement illustrated can be so adjusted that through the medium of spring 100 a certain spring load can be applied to hold the reaction member in the position shown in Fig. 2 even though no reaction torque is applied to the member. With such an adjustment torque hydraulically applied to the back of the reaction blades and tending to turn the reaction member in the same direction as the turbine member would be required to shift the torque control member. This will correspond to a speed of the secondary member relative to that of the primary member higher than that representing the shift point of the converter.

The invention is in no way limited to the specific form of construction of the converter and while in the previous discussion a converter of the rotating casing type has been chosen for purposes of illustration, the invention is equally applicable to converters of the stationary casing type combined with direct drive, of which those disclosed in Lysholm Patent No. 1,900,119 are examples.

Figure 7:
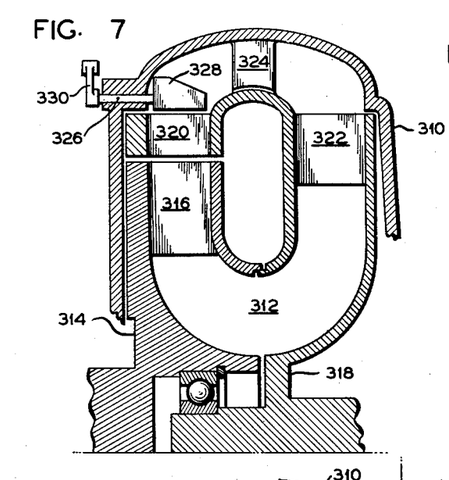
Fig. 7 is a fragmentary longitudinal section illustrative of the application of one of the features of the invention to a transmission embodying a torque converter of different construction than that shown in Fig. 1.
Figure 8:
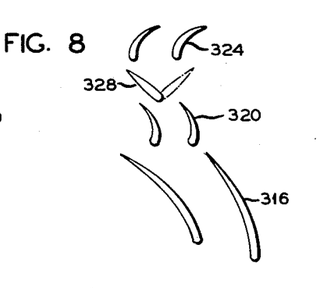
Fig. 8 is a diagrammatic view illustrative of the blading shown in Fig. 7.

In Figs. 7 and 8 there is diagrammatically illustrated, by way of example, one way in which automatic torque responsive control may be obtained with a converter of the stationary housing type. As shown in these figures the stationary housing is indicated at 310. This provides the working chamber 312 in which is rotatably mounted the primary pump member 314 carrying blades 316. Also mounted in the chamber is the turbine or driven member 318 carrying the two rows of turbine blades 320 and 322. The housing 310 carries a row of stationary reaction blades 324.

Turnably mounted in the wall of casing 310 is a shaft 326 which at its inner end carries a blade or vane 328 disposed in the hydraulic circuit between the first row of turbine blades 320 and the reaction blades 324. Assuming the pump blades to turn in clockwise direction as viewed in Fig. 8, the turbine blades 320 will turn in the same direction. At stall or relatively low turbine speeds the peripheral component of the discharge from the blades 320 will be to the left as seen in Fig. 8 and will consequently turn the vane 328 to the full line position shown in the figure. As the speed of the turbine increases the peripheral component of the diescharge will gradually swing from left to right as seen in the figure until at a speed corresponding to the shift point of the converter the delivery of fluid to the stationary reaction blades 324 will be such as to produce no torque on these blades. The vane 328 will swing in accordance with this change in the direction of flow and through the medium of control arm 330 this vane may be so connected as to effect a shift of a control device such as switch 122 in accordance with the position of the vane, which is in turn indicative of the presence or absence and also of the specific value and sense of the reaction torque applied to the blades 324.

Figure 9:
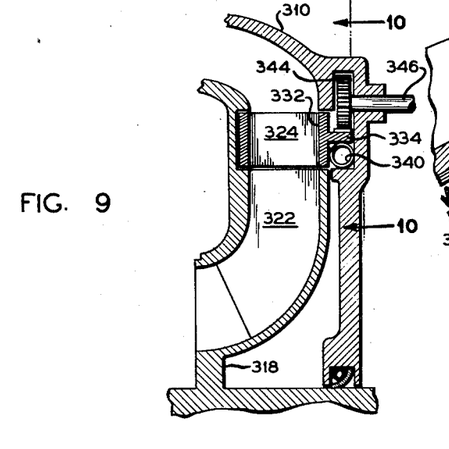
Fig. 9 is a view similar to Fig. 7 showing application of certain features of the invention to still another form of converter.
Figure 10:
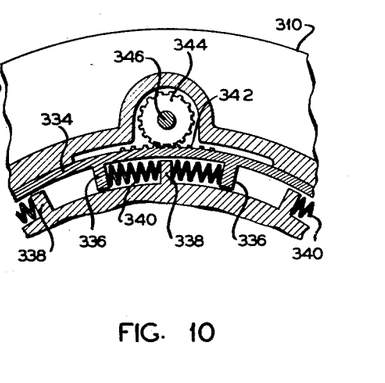
Fig. 10 is a fragmentary view taken on the line 10—10 of Fig. 9.

In Figs. 9 and 10 is still another arrangement very similar to the arrangement shown in Fig. 1. In this construction the stationary casing is indicated at 310 and the turbine member at 318. In this instance the reaction blades 324 are carried by a reaction ring member 332 mounted to have turning movement in the stationary casing. This ring member is provided with a flange 334 provided wtih spring retaining abutments 336 between which and similar spring retaining abutment 338 on the casing 310 there are located suitable springs 340. Flange 334 is further provided with a rack 342 engaging the teeth of a pinion 344 carried by a shaft 346 turnably mounted in the casing 310. As will be apparent from the preceding descriptions, the reaction member is movable under the influence or absence of the reaction torque thereon to turn the shaft 346 the movement of which may be utilized, as previously explained, for the operation of a torque control device.

So far as the present invention is concerned various different forms of clutches for effecting direct drive may be employed, such for example as synchronized dog clutches, and for the operation of such clutches, as well as for the operation of friction clutches, servo-motor and other intermediate operating mechanisms may be employed which advantageously may make use of pressure fluid derived from the working fluid circuit of the converter, the pressure lubricating system of the engine, or otherwise. In this connection it is to be noted that in the event positively engaging clutches of the tooth or dog type are employed, means must be provided momentarily relieving the driving torque through such clutches when shift is desired from direct to hydraulic drive. Such momentary torque relief may be provided by means incorporated in the control circuits for momentarily grounding the ingition or cutting off the fuel supply to the engine in a manner analogous to the means for momentarily reducing the engine speed and power illustrated in Figs. 5 and 6.

The control devices such as the torque and speed responsive devices and the manual overrule controlled by actuation of the throttle pedal may be employed within the scope of the invention with systems actuated by means other than electrical. From the standpoint of simplicity electrical control is advantageously used. Also where electrical control is employed the several control devices need not necessarily be employed in a relay circuit but may operate directly on suitable clutch shifting mechanism. However, the use of the relay circuit which enables small current values at low voltage to be employed is ordinarily most desirable. Further in connection with the use of the invention with stationary casing types of converters it is to be noted that as disclosed in the Lysholm patent previously mentioned the turbine member of the converter is ordinarily connected to the driven or output member of the transmission by means of a releasable clutch, such as a one-way overrunning clutch, which permits the turbine member to come to rest when the pump member of the converter is disconnected and direct drive employed between the input and output members of the transmissions. With the stationary casing type of converter, when direct drive is employed, the pump, reaction and turbine members are all rotationally stationary to avoid parasite hydraulic losses, in contrast with the case of a rotating casing converter where the pump, reaction and turbine members rotate together as a unit to avoid such losses when in direct drive. Consequently in the case of a transmission having a stationary converter casing the speed responsive control device should not be driven directly from the turbine member which comes to rest under direct drive conditions but from a driven member indicative of the output shaft speed in either hydraulic or direct drive.

As will readily be apparent the principles of the invention are applicable to a wide variety of specific arrangements and designs of both control systems and converter constructions, and the disclosure herein is accordingly to be understood as illustrative only, the scope of the invention including all forms of apparatus falling within the purview of the appended claims.

What I claim is:

1. A transmission for transmitting power from a driving member to a driven member comprising a first means including a hydrodynamic torque converter, a second means for alternatively transmitting power between said members, and a control system for governing the operation of said first means and said second means, said system including a first device responsive to the speed of operation of said driven member for normally rendering said second means inoperative and said first means operative when the speed of the driven member is below a predetermined minimum value, a second device responsive to an impulse indicative of a predetermined minimum value of the ratio of torque increase between said members produced by said first means for automatically shifting the path of power transmission from said first means to said second means, means associated with said second device for establishing said predetermined minimum value of the torque ratio at a value greater than unity, whereby said automatic shift may be effected when said first means is effecting an increase in the torque transmitted therethrough from said driving member to said driven member, and manually operable means selectively operable to shift the path of power transmission from said first means to said second means or vice versa when said torque ratio and the speed of said driven member are both above their respective predetermined minimum values.

2. A transmission for transmitting power from a driving member to a driven member comprising a first means including a hydrodynamic circuit having pump blading, turbine blading and reaction blading in the circuit, a second means for alternatively transmitting power between said members, control means including a device responsive to a predetermined minimum value of reaction torque applied to said reaction blading for automatically shifting the path of power transmission from said first means to said second means, means associated with said device adjustable to establish a selected positive value for said predetermined minimum value of reaction torque, whereby said automatic shifting may be effected when the torque delivered by said first means to the driven member is greater than the torque input from said driving member, and manually operable control means for selectively shifting the path of power transmission from said first means to said second means.

3. A transmission for transmitting power from a driving member to a driven member comprising a first means including a hydrodynamic circuit having pump blading, turbine blading and reaction blading in the circuit, a second means for alternatively transmitting power between said members, and a control system for governing the operation of said first means and said second means, said system including a first device indicative of the speed of operation of said driven member for normally rendering said second means inoperative and said first means operative when the speed of the driven member is below a predetermined minimum value, a second device responsive to a predetermined minimum value of the reaction torque applied to said reaction blading for automatically shifting the path of power transmission from said first means to said second means, means associated with said second device for establishing said predetermined minimum value of the reaction torque at a value greater than unity, whereby automatic shift may be effected when said first means is effecting an increase in the torque transmitted therethrough from said driving member to said driven member, and manually operable means selectively operable to shift the path of power transmission from said first means to said second means or vice versa when said torque ratio and the speed of said driven member are both above their respective predetermined minimum values.

4. The combination, with a transmission for transmitting power from an engine to a driven member alternatively through two different paths of power transmission one of which includes a hydrodynamic torque converter and the other of which includes a releasable clutch, of a control system for controlling the operation of said clutch including an electric circuit for causing engagement of said clutch when the circuit is energized, said circuit including a speed switch arranged to be closed whenever the speed of said driven member exceeds a predetermined value, a torque switch arranged to be closed whenever the reaction torque developed by said converter falls to a predetermined minimum value and a normally closed manually operable switch arranged to be selectively opened at will by an operator, said circuit being energized to effect engagement of said clutch when all of said switches are closed.

5. Apparatus as set forth in claim 4 in which a manually operable control member is provided for controlling the power developed by the engine and said manually operable switch is arranged to be opened by movement of said control member past a position corresponding to full engine power.

6. Apparatus as set forth in claim 5 in which said control member is a pedal and said switch is arranged to be opened by depression of the pedal to a lower limit position below the position producing full engine power.

7. Apparatus as set forth in claim 6 including means for returning said switch to closed position upon return of the pedal to a position in the operating range within which it controls the power of the engine.

8. Apparatus as set forth in claim 4 including a connection providing a shunt across said manually operable switch and a speed switch automatically operable to close said connection and thereby render said manually operable switch inoperative to open said circuit whenever the speed of said driven member exceeds a second predetermined value higher than the first mentioned predetermined value.

9. Apparatus as set forth in claim 4 including an auxiliary connection providing a shunt across said switches and a manually operable switch for closing said circuit independently of the positions of the remainder of said switches.

10. A power transmission comprising a hydrodynamic torque converter for transmitting power from a driving member to a driven member, said converter having a rotatable casing enclosing the hydraulic circuit and a rotatably mounted reaction member, a rotationally stationary housing, a releasable clutch for connecting said casing and said reaction members, a one way clutch between said reaction member and said driven member for preventing the reaction member from turning faster than the driven member, a reaction force transmitting member carried by said stationary housing and having limited turning movement relative thereto, a second one way clutch for transmitting reaction torque to said force transmitting member and a control device operable to influence the actuation of the first mentioned clutch, said device being operatively associated with and controlled in accordance with the position of said force transmitting member within its limited range of movement.

11. A transmission as set forth in claim 10 in which said driven member comprises an axially central shaft part carrying the turbine blading of the converter, said reaction member includes a hollow shaft part around the first mentioned shaft part and said force transmitting member comprises a ring element around the shaft part of the reaction member, the first mentioned one way clutch being between said shaft parts and the second mentioned one way clutch being between the shaft part of the reaction member and said force transmitting member.

12. A transmission as set forth in claim 11 in which said force transmitting member is centered in a bore in said housing and permitted limited turning movement therein by a spline connection having peripheral play.

13. A transmission for transmitting power from a driving member to a driven member comprising a first means including a hydrodynamic torque converter having a turnably mounted reaction member, a second means including a releasable clutch for alternatively transmitting power between said members, and a control system adapted to be energized to effect engagement of said clutch upon movement of said reaction member from its normal reaction torque transmitting position in a direction opposite that in which the reaction torque is applied, said system including a speed responsive device for normally rendering said movement of said reaction member ineffective to cause engagement of said clutch when the speed of said driven member is below a predetermined minimum and manually controlled auxiliary means for effecting engagement of said clutch regardless of the presence or absence of reaction torque on said reaction member and independently of the speed of said driven member.

14. A transmission for transmitting power from a driving member to a driven member comprising a first means including a hydrodynamic torque converter having a turnably mounted reaction member, a second means including a releasable clutch for alternatively transmitting power between said members, and a control system adapted to be energized to effect engagement of said clutch upon movement of said reaction member from its normal reaction torque transmitting position in a direction opposite that in which the reaction torque is applied, said system including a speed responsive device for normally rendering said movement of said reaction member ineffective to cause engagement of said clutch when the speed of said driven member is below a predetermined minimum, a manually operable overrule element movable within a normal range of movement to control the power input to the transmission, means operable by movement of said element to an abnormal position outside said range when said clutch is engaged and when the speed of said driven member is above said predetermined minimum to effect disengagement of the clutch regardless of the position of said reaction member and means operable upon movement of said element to said abnormal position to effect disengagement of said clutch to momentarily diminish or interrupt the power flow to the transmission.

15. A transmission for transmitting power from a driving member to a driven member comprising a first means including a hydrodynamic torque converter having a turnably mounted reaction member, a second means including a releasable clutch for alternatively transmitting power between said members, and a control system adapted to be energized to effect engagement of said clutch upon movement of said reaction member from its normal reaction torque transmitting position in a direction opposite that in which the reaction torque is applied, said system including a speed responsive device for normally rendering said movement of said reaction member ineffective to cause engagement of said clutch when the speed of said driven member is below a predetermined minimum, a manually operable overrule element movable within a normal range of movement to control the power input to the transmission and means operable by movement of said element to an abnormal position outside said range when said clutch is engaged and when the speed of said driven member is above said predetermined minimum to effect disengagement of the clutch regardless of the position of said reaction member, said speed responsive device including means operable to render said overrule element ineffective to effect disengagement of said clutch when the speed of said driven member is greater than a predetermined maximum.

16. A transmission for transmitting power from a driving member to a driven member comprising a first means including a hydrodynamic torque converter having a turnably mounted reaction member, a second means including a releasable clutch for alternatively transmitting power between said members, and an electrically energized control system for effecting engagement of said clutch upon movement of said reaction member from its normal reaction torque transmitting position in a direction opposite that in which the reaction torque is applied, said system including a speed responsive device controlling an electric circuit to normally render said movement of said reaction member ineffective to cause engagement of said clutch when the speed of said driven member is below a predetermined minimum.

17. A transmission for transmitting power from a driving member to a driven member comprising a first means including a hydrodynamic torque converter having a turnably mounted reaction member, a second means including a releasable clutch for alternatively transmitting power between said members and an electrically energized control system for effecting engagement of said clutch upon movement of said reaction member from its normal reaction torque transmitting position in a direction opposite that in which the reaction torque is applied, said system including a speed responsive device controlling an electric circuit to normally render said movement of said reaction member ineffective to cause engagement of said clutch when the speed of said driven member is below a predetermined minimum and manually controlled electrically energized auxiliary means for effecting engagement of said clutch regardless of the presence or absence of reaction torque on said reaction member and independently of the speed of said driven member.

18. A transmission for transmitting power from a driving member to a driven member comprising a first means including a hydrodynamic torque converter having a turnably mounted reaction member, a second means including a releasable clutch for alternatively transmitting power between said members, and an electrically energized control system for effecting engagement of said clutch upon movement of said reaction member from its normal reaction torque transmitting position in a direction opposite that in which the reaction torque is applied, said system including a speed responsive device controlling an electric circuit to normally render said movement of said reaction member ineffective to cause engagement of said clutch when the speed of said driven member is below a predetermined minimum, a manually operable overrule element movable within a normal range of movement to control the power input to the transmission and electrically energized means operable by movement of said element to an abnormal position outside said range when said clutch is engaged and when the speed of said driven member is above said predetermined minimum to effect disengagement of the clutch regardless of the position of said reaction member.

19. A transmission for transmitting power from a driving member to a driven member comprising a first means including a hydrodynamic torque converter having a turnably mounted reaction member, a second means including a releasable clutch for alternatively transmitting power between said members, and an electrically energized control system for effecting engagement of said clutch upon movement of said reaction member from its normal reaction torque transmitting position in a direction opposite that in which the reaction torque is applied, said system including a speed responsive device controlling an electric circuit to normally render said movement of said reaction member ineffective to cause engagement of said clutch when the speed of said driven member is below a predetermined minimum, a manually operable overrule element movable within a normal range of movement to control the power input to the transmission, means electrically energized operable by movement of said element to an abnormal position outside said range when said clutch is engaged and when the speed of said driven member is above said predetermined minimum to effect disengagement of the clutch regardless of the position of said reaction member and electrically actuated means operable upon movement of said element to said abnormal position to effect disengagement of said clutch to momentarily diminish or interrupt the power flow to the transmission.

20. A transmission for transmitting power from a driving member to a driven member comprising a first means including a hydrodynamic torque converter having a turnably mounted reaction member, a second means including a releasable clutch for alternatively transmitting power between said members, and an electrically energized control system for effecting engagement of said clutch upon movement of said reaction member from its normal reaction torque transmitting position in a direction opposite that in which the reaction torque is applied, said system including a speed responsive device controlling an electric circuit to normally render said movement of said reaction member ineffective to cause engagement of said clutch when the speed of said driven member is below a pre-determined minimum, a manually operable overrule element movable within a normal range of movement to control the power input to the transmission and means operable by movement of said element to an abnormal position outside said range when said clutch is engaged and when the speed of said driven member is above said predetermined minimum to effect disengagement of the clutch regardless of the position of said reaction member, said speed responsive device including electrical control means operable to render said overrule element ineffective to effect disengagement of said clutch when the speed of said driven member is greater than a predetermined maximum.

21. A transmission for transmitting power from a driving member to a driven member comprising a first means including a hydrodynamic torque converter, a second means including a releasable clutch for alternatively transmitting power between said members, and a control system for governing the operation of said first means and second means, said system including a first device responsive to the speed of operation of said driven member for normally preventing engagement of said clutch to render said second means inoperative when the speed of said driven member is below a predetermined minimum value, a second device responsive to an impulse indicative of a predetermined minimum value of the ratio of torque increase between said members produced by said first means for automatically causing engagement of said clutch to shift the path of power transmission from said first means to said second means, means associated with said second device for establishing said predetermined minimum value of the torque ratio at a value greater than unity, and manually operable means selectively operable to effect engagement or disengagement of said clutch and thereby select either said first means or said second means for power transmission when said torque ratio and the speed of said driven member are both above their respective minimum values, said first device including means operable to render said manually operable means ineffective to effect disengagement of said clutch when the speed of said driven member is greater than a predetermined maximum.

References Cited in the file of this patent

UNITED STATES PATENTS

| Number | Name | Date |
|---|---|---|
| 2,037,252 | Martyrer et al. | Apr. 14, 1936 |
| 2,302,714 | Pollard | Nov. 24, 1942 |
| 2,337,748 | Gsching | Dec. 28, 1943 |
| 2,349,937 | Buchhart | May 30, 1944 |
| 2,427,458 | Jandasek | Sept. 16, 1947 |
| 2,440,825 | Jandasek | May 4, 1948 |
| 2,480,933 | Jandasek | Sept. 6, 1949 |
| 2,568,007 | Jandasek | Sept. 18, 1951 |

FOREIGN PATENTS

| Number | Country | Date |
|---|---|---|
| 594,393 | Great Britain | Nov. 11, 1947 |